Apr. 10, 1923.

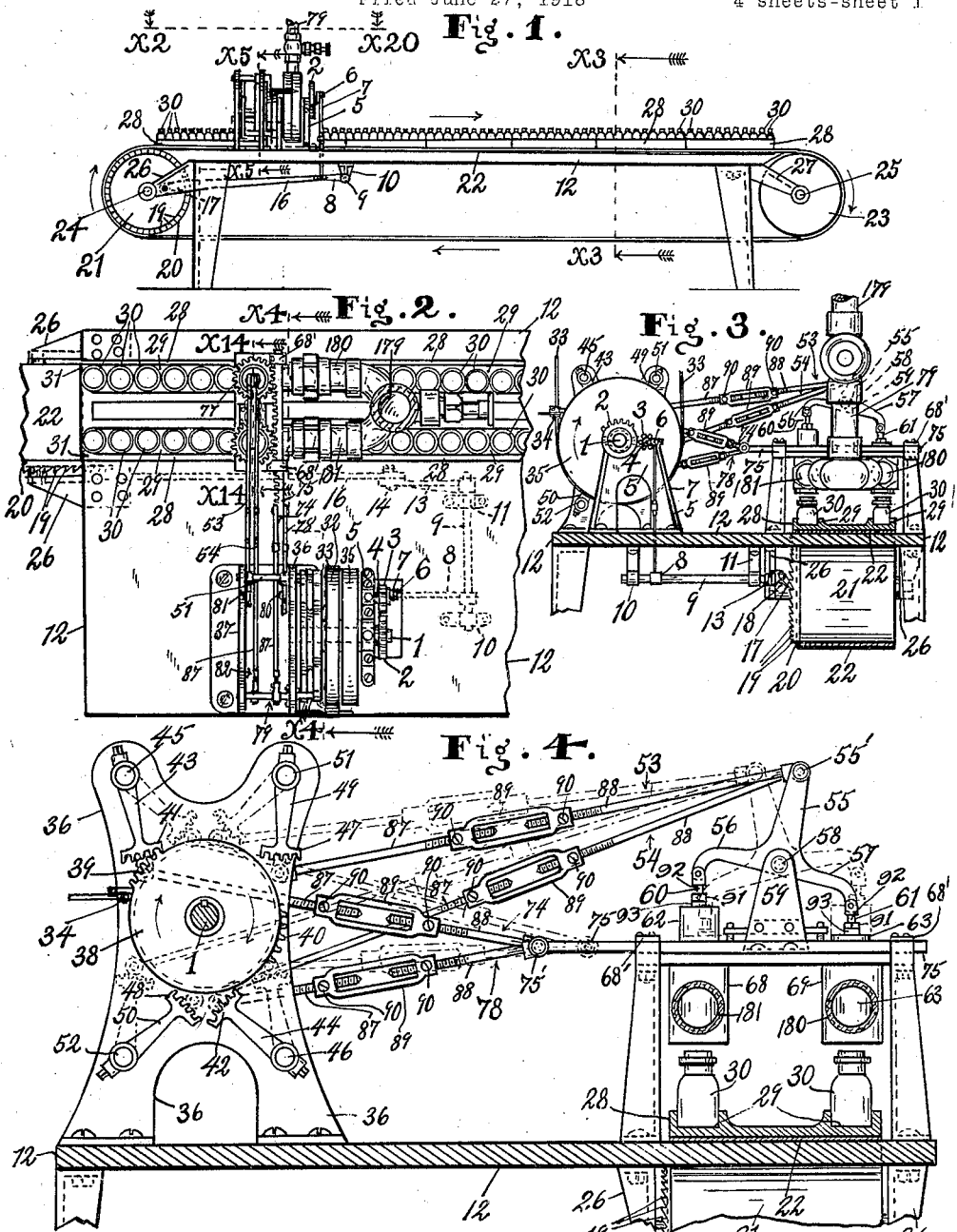

S. H. KELLOGG

MEASURING APPARATUS

Filed June 27, 1918

Witness:
W. M. Gentle
C. C. Holly

Inventor.
Sylvanus H. Kellogg.
by James R. Townsend
his atty.

Apr. 10, 1923.  
S. H. KELLOGG  
MEASURING APPARATUS  
Filed June 27, 1918  
1,451,512  
4 sheets-sheet 3
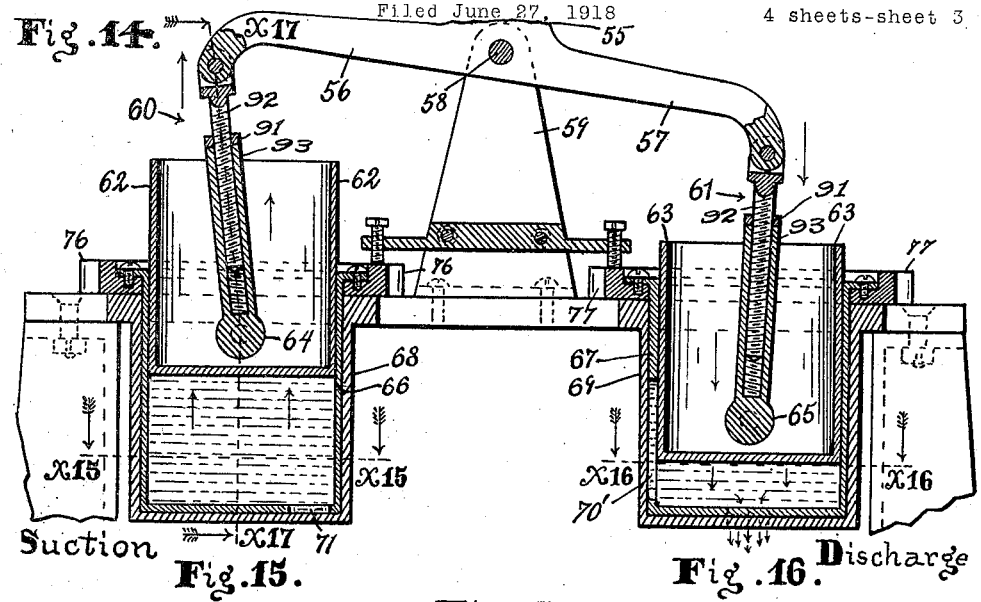
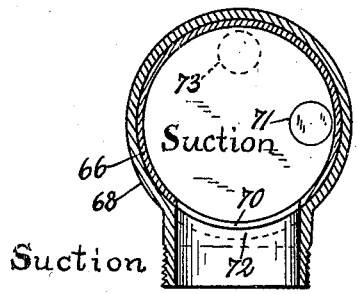
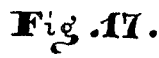
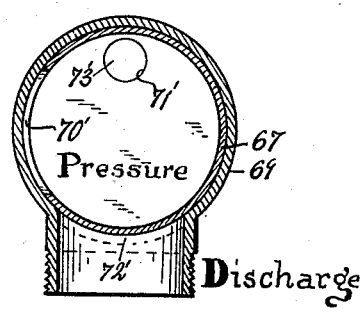
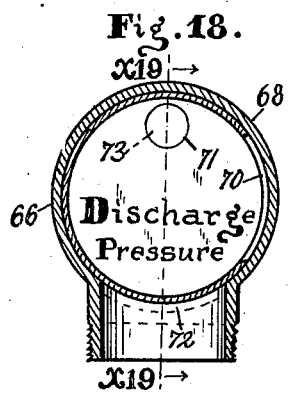
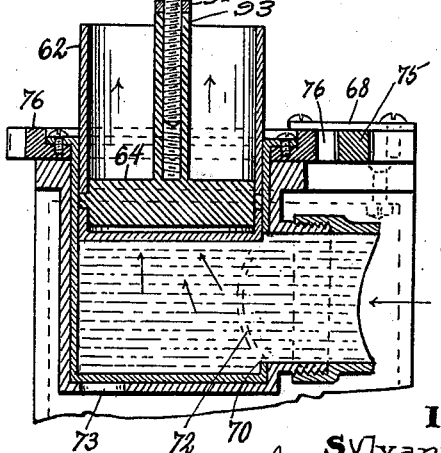
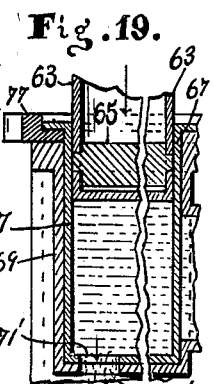
Witness:  
W. M. Gentle.  
C. C. Holly.
Inventor.  
Sylvanus H. Kellogg.  
by James R. Townsend  
his atty.

Apr. 10, 1923. 1,451,512
S. H. KELLOGG
MEASURING APPARATUS
Filed June 27, 1918 4 sheets-sheet 4

Witness:
W. M. Gentle
C. C. Holly

Inventor.
Sylvanus H. Kellogg.
by James R. Townsend
his atty.

Patented Apr. 10, 1923.

1,451,512

UNITED STATES PATENT OFFICE.

SYLVANUS H. KELLOGG, OF LOS ANGELES, CALIFORNIA.

MEASURING APPARATUS.

Application filed June 27, 1918. Serial No. 242,290.

*To all whom it may concern:*

Be it known that I, SYLVANUS H. KELLOGG, a citizen of the United States, residing at 2312 Echo Park Avenue, Los Angeles, California, have invented a new and useful Measuring Apparatus, of which the following is a specification.

An object of this invention is to provide means for accurately measuring materials which flow in a sluggish manner.

More specifically, an object is to provide means for filling bottles with viscid fluids, analogous to honey in consistency, without waste or smearing of the substance and with maximum rapidity as compared with former means for bottling viscid liquids.

An object is to provide safe and convenient means for bottling a certain viscid poisonous ant paste composition.

The invention is not limited in its use to measuring and bottling viscid fluids but may be applied to measuring other materials and products that are adapted to flow and the stream of which can be cut off. Simplicity and cheapness of construction and certainty of action are further objects.

Another object is to provide an apparatus adapted to the purpose above stated, and which will fill two containers at each cycle of operation and will automatically bring the containers into filling position before filling, and move them out of filling position after filling, and so on throughout any desired period of operation.

Another object is to make provision for adjusting the measuring devices to deliver various sized charges.

Other objects and advantages may appear from the accompanying drawings, the subjoined detail description and the appended claims.

The accompanying drawings illustrate the invention.

Figure 1 is a side elevation of the receptacle filling apparatus, with trays of filled and unfilled receptacles in place.

Fig. 2 is a fragmental plan of one end of the apparatus as viewed from line $x^2$—$x^{20}$, Fig. 1.
Fig. 3 is a fragmental transverse sectioned elevation on line $x^3$, Fig. 1.

Fig. 4 is a staggered transverse section on line $x^4$—$x^4$, Fig. 2.

Figures 5, 6:
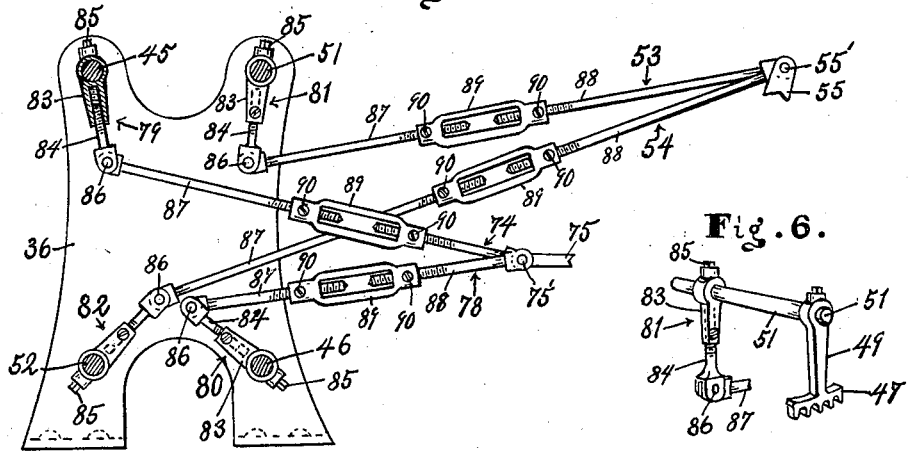
Fig. 5 is a fragmental elevation in section on line $x^5$, Fig. 1, showing the arrangement of rocker arms and portions of their connections to operate the receptacle filling means.
Fig. 6 is a perspective view of one of the rocker shafts and the arm and segmental gear for operating it.
Figures 7, 8:
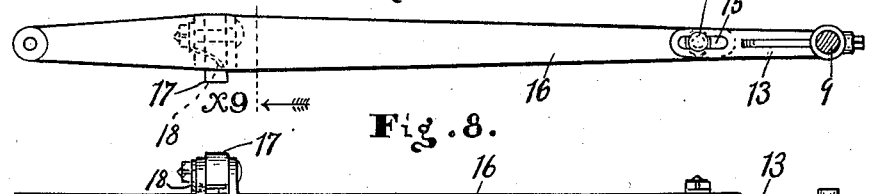
Fig. 7 is a side elevation of the belt moving ratchet lever, one end of which is shown connected to the oscillating arm that intermittently operates it.
Fig. 8 is an edge view of the ratchet lever and its end connection.
Figures 9, 10, 11, 12:
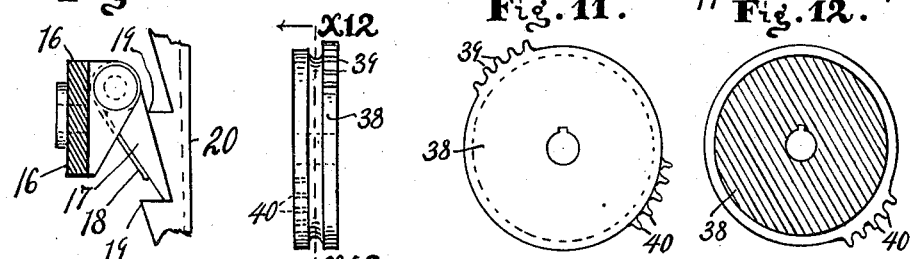
Fig. 9 is a section on line $x^9$, Fig. 7, showing the mounting of the ratchet on the lever; and also showing a fragment of the ratchet wheel.
Fig. 10 is an edge elevation of the double segmental gear that operates the toothed segments of the rocker arms.
Fig. 11 is an elevation of the right side of Fig. 10.
Fig. 12 is a section on line $x^{12}$, Fig. 10, looking in the direction of the arrows.
Figure 13:
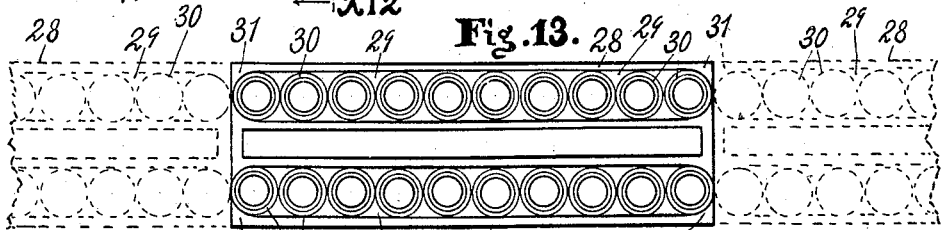

Fig. 13 is a plan showing in full lines one of the trays filled with bottles, and, in dotted lines fragments of other trays joining end to end, the one in full lines, and indicating that the bottles form a continuous line without break at the ends of the tray or elsewhere, by which supply of empty bottles to, and removal of filled bottles from, the filling apparatus, can be made automatic and continuous.

Fig. 14 is a fragmental elevation partly in section on line $x^{14}$, Fig. 2, showing the bottle-filling mechanism in operation; the direction of the appropriate movement being indicated by unfeathered arrows.

Fig. 15 is a horizontal section of one of the measuring devices on line $x^{15}$, Fig. 14, showing the inlet open and the outlet closed.

Fig. 16 is a horizontal section of the second measuring device on line $x^{16}$, Fig. 14, showing the inlet closed and the outlet open.

Fig. 17 is a fragmental sectional elevation on line $x^{17}$, Fig. 14, showing the inlet open and the outlet closed. The directions of piston and fluid travel is indicated by unfeathered arrows.

Fig. 18 is a horizontal section analogous to Fig. 16 showing the measuring device of Fig. 15 with inlet closed and outlet open.

Fig. 19 is a broken fragmentary sectional elevation of the measuring device of Fig. 16 showing the inlet closed and outlet open as in Fig. 16 for discharging the fluid from the measuring device as indicated by the unfeathered arrows.

Figure 20:
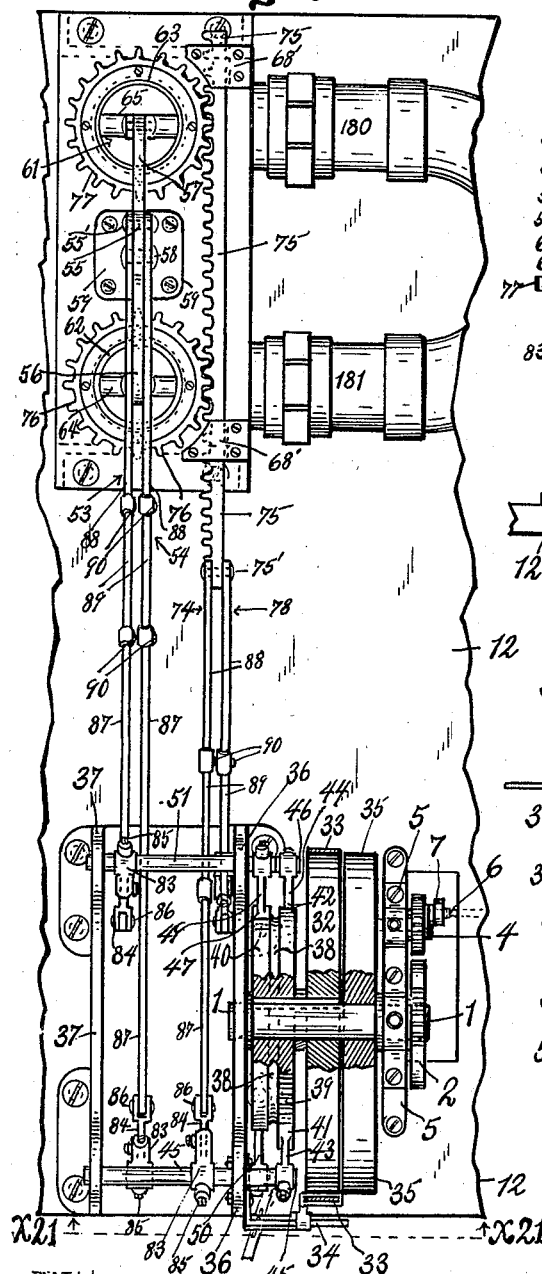

Fig. 20 is a fragmental plan on an enlarged scale from line $x^2$—$x^{20}$, Fig. 1, showing portions of the driving mechanism and the bottle filling means.

Figures 21, 22:
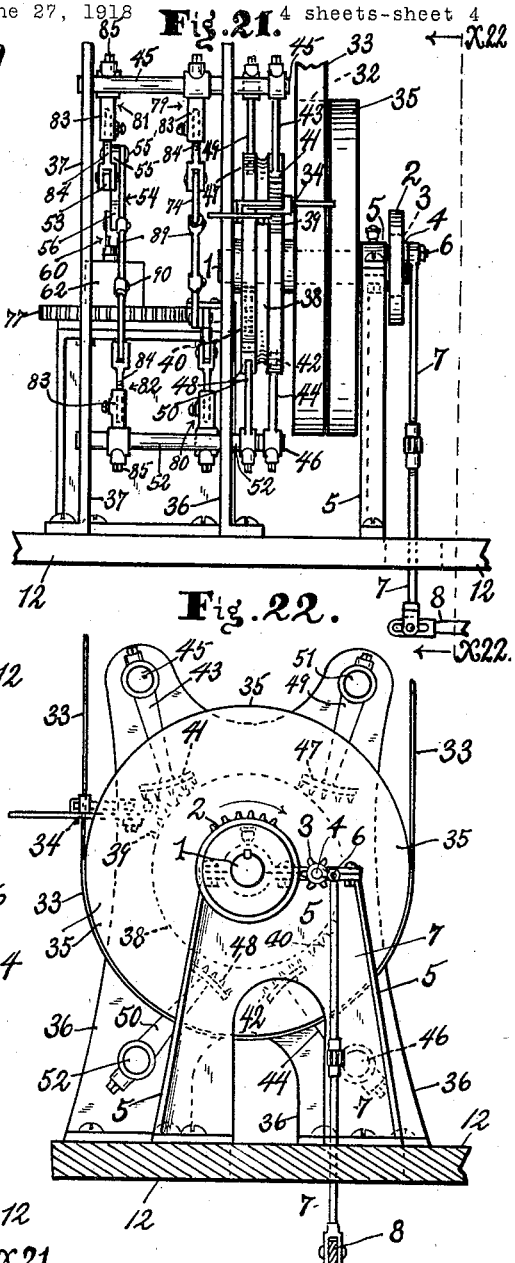

Fig. 21 is a side elevation viewed from line $x^{21}$—$x^{21}$, Fig. 20.

Fig. 22 is a section on line $x^{22}$, Fig. 21.

The master shaft 1 is provided with a mutilated gear 2 adapted to cause one revolution of an intermittently operated pinion 3 at each revolution of the shaft 1. Said crank pinion is journaled on a stud 4 which projects from a support 5 and said pinion is provided with a crank pin 6, that operates a connecting rod 7 and is thereby connected to the rock arm 8, of a rock shaft 9 which is journaled in bearings 10, 11, that are carried by the table 12, upon which the support 5 is mounted. The rocking arm 13 of the rock shaft 9 is operably connected through pin and slot connection 14, 15, and lever 16, with a pawl 17 adapted by spring 18 to engage teeth 19 of a ratchet wheel 20 that is fixed to the drive drum 21 which drives a belt 22 that is bent around said drum 21 and around a second drum 23. Said drums are mounted respectively on horizontal shafts 24, 25, carried by bearings 26, 27, that are supported by a base formed of the table 12, the top of which is flat to form a guide for the upper limb of the belt 22 for a considerable length to support trays 28, each of which is provided with seats 29 for receptacles 30 that are to receive the measured liquid. Said seats are equal in width to the respective diameters of the receptacles 30 and are equal in length to a multiple of such diameters, so that when a seat 29 is filled, it will contain a row of receptacles extending from end to end of the tray, the peripheries of the end receptacles being tangent to the ends of the tray.

By arranging the receptacles tangent to each other in the tray a greater number of such receptacles (diameters being equal) are enabled to pass under the filling means per foot length of conveyor, than in devices of this character heretofore known.

The ratchet teeth 19 are proportional to the diameter of the respective receptacles, so that at each operation of the pinion 3 by the mutilated gear 2, the belt 22 will be moved forward a step equal to the diameter of the receptacle.

That is to say, the carrier comprises the belt 22 operable on the track formed by the level surface of the table 12, and removable trays 28. Said trays are respectively provided with two elongate receptacle seats 29 that terminate at the ends of the trays where they are provided with retainers 31; and said trays are adapted to accommodate an exact number of receptacles 30 between said retainers which are spaced apart, so that when the seats are supplied with the full quota of receptacles, the peripheries of the end receptacles will be tangent to the ends of the trays. The receptacles are preferably round in plan as indicated in Fig. 2. The trays may be flat boards and the seats 29 are preferably depressions which may be grooves cut in the surface of the trays, the inner walls of the retainers being curvilinear as indicated at 31 to conform to the peripheries of the end receptacles 30.

The step by step mechanism provided to operate the belt 22 is thus adapted to move two continuous rows of receptacles along the table with considerable periods of rest between the successive movements to allow the receptacles to be charged; and the belt may be supplied with trays of empty receptacles at one end; and trays of filled receptacles may be removed from the other end of the table without interrupting or interfering with the step by step movement. The mutilated gear 2 is adapted to cause one complete revolution of the pinion 3 and crank pin 6 during a minor portion of the revolution of the master shaft so as to comparatively prolong the period of rest.

The pawl 17 is arranged to act downwardly upon the inner side of the ratchet wheel 20 thus to cause the top limb of the belt 22 to travel toward the second drum 23 during a portion of each revolution of the master shaft 1.

The teeth of the mutilated gear 2 equal the number of teeth on the pinion, so that at each revolution of the master shaft 1 there is one complete operation of the pawl 17 to move the drive drum 21 and the belt 22 a step equaling the space of one tooth, and the diameter of each receptacle is equal to the length of one step of the belt.

In Fig. 13 the tray 28 is shown as exactly equal in length to ten receptacle diameters; and the seats 29 are equal in width to one, and in length to ten receptacle diameters and are conformed at their ends to segments of the peripheries of the receptacles.

The driving pulley 32 is fixed to the master shaft 1 and is driven by a belt 33 which may be shifted by means of the belt shifter 34 onto the idler 35 that is journaled on the master shaft.

By the mechanism above described the belt on the conveyor is adapted to remove and emplace receptacles two by two beneath charging housings hereinafter set forth.

The further end of the master shaft 1 is journaled in a section 36 of the supporting frame, which comprises the base 12 and the upright supports formed of sections 5, 36 and 37. A mutilated gear wheel 38 is fixed to the master shaft 1 and is provided with disalined revoluble toothed segments 39, 40, each of which is adapted to operate two oscillating toothed segments. The revolving toothed segment 39 successively engages the segments 41, 42, on the arms 43, 44, respectively, of the rock shafts 45, 46, that are journaled in the sections 36, 37. The revolving toothed segment 40, successively engages the oscillating toothed segments 47, 48 of the oscillating arms 49, 50, that are respectively fixed to the rock shafts 51, 52 which are journaled in the sections 36, 37. The oscillating segments 41, 42 and the toothed segment 39 are in one plane and the oscillating segments 47, 48 and the toothed segment 40 are in another plane; so that at each revolution of the intermittent gear wheel, each revolving segment will engage its two oscillating segments. Said oscillating segments are in pairs and the oscillating segments of each pair are connected together so that the operation of one adjusts the other into position to be operated, and vice versa.

Each revolution of each revolving toothed segment will operate two of the oscillating segments, and each revolution of the master shaft oscillates all the rock shafts. The toothed segments are on opposite sides of the periphery of the wheel 38, and the oscillating segments are spaced apart, so that the operation of each oscillating segment will occur when the other segments are at rest. The segments 47 and 48 are arranged on opposite sides of the wheel 38 and are connected to each other through adjustable connecting rods 53, 54, respectively that are pivotally connected to the central arm 55 of a three-armed walking beam bell crank which is provided with horizontal plunger arms 56, 57, and is fulcrumed at 58 to a stationary support 59. The walking beam plunger arms 56, 57, are respectively connected by adjustable rods 60, 61, to hollow trunk plungers 62, 63, to which the connecting rods are pivoted at 64, 65, so that upon the oscillation of the walking beam the plungers will be operated.

Such plungers are cylindrical and operate in cylindrical shells 66, 67, respectively, that snugly fit rotatably in the housings 68, 69. Said shells 66, 67 are provided respectively with lateral intake ports 70, 70' and with outlet ports 71, 71'. The housings 68, 69 constitute port closing means and are provided with inlet ports 72, 72' and with outlet ports 73, 73'. The plunger arms 56, 57 of the walking beam are of equal length and the plunger rods 60, 61, reciprocate the plungers 62, 63 alternately in their oscillatory shells. Such reciprocation is effected through the oscillating rocker arm segments 47 and 48 operated by the toothed revolving segment 40.

Referring to Fig. 4 it will be seen that the oscillating segment 47 has been rocked to the right by the toothed segment 40 and that the walking beam is at rest and will so remain until said toothed segment 40 engages the oscillating segment 48, at which time the walking beam will be rocked to the left by the connecting rod 54.

During this period of rest the revolving toothed segment 39 will operate the oscillating segment 41, thereby operating the connecting rod 74 that is connected to the horizontal rack 75, the teeth of which engage with the toothed rims 76, 77 that are fixed respectively to the shells 66 and 67. Said rack is mounted in a guideway 68' and is connected by a connecting rod 78 with the oscillating segment 42.

It is thus seen that the oscillating toothed segments are arranged in two couples one couple comprising the oscillating segments 41, 42, oppositely arranged relative to the shaft 1, and the other couple comprising the oscillating segments 47, 48, also oppositely arranged relatively to the shaft 1; and that the four oscillating segments are spaced apart about the shaft so as to be successively operated by the respective revolving segments. The couple 41, 42 is operated by the revolving segment 39 while the couple 47, 48 of oscillating segments is operated by the revolving segment 40.

The oscillating segments 41, 42 of the first couple are connected together so that the operation of one effects the operation of the other and this is likewise true with regard to the second couple formed of oscillating segments 47, 48. The connection between the segments 47, 48, comprises the connecting rods 53, 54, connected by a pin 55' with the oscillating arm 55 of the walking beam. The connection between the oscillating segments 41, 42 comprises the connecting rods 74, 78, and the pins 75' connected to the reciprocating rack 75.

It is understood that the connection between the oscillating segments of either couple and the mechanism operated by such segments may be made by any suitable means, and such means may be adjustable for the purpose of adjusting the apparatus to increase and decrease the amount of liquid in each charge.

In the form shown, the rock shafts 45, 46, 51, 52 are provided with transmitting arms 79, 80 and 81, 82 respectively. Thus the rack 75 is operated in one direction by the oscillating segment 41; and at such operation also operates the oscillating segment 42, through the medium of the connecting rod 78, and adjusts said segment to its gear receiving position ready to receive and be acted on by the revolving toothed segment.

It will be particularly noted that the revolving segment 40 has passed the oscillating segment 47 and is advanced toward the rock arm segment 48, which segment 48 is in position to receive the revolving segment 40 and to thereby be operated to the left as the segment 40 passes it. The segment 39 is just in engagement with the oscillating segment 41 and upon further revolution will shift segment 41 to the right which will shift segment 42 to the right into a position relative to the segment 39 that corresponds to the relative positions of 39 and 41 shown in solid lines in Fig. 4. This movement is effected during the transit of the segment 39 across the toothed face of the oscillating segment 41 and such movement shifts the rack 75 to the right in Fig. 4, thus oscillating on their vertical or longitudinal axes, both of the shells 66, 67, sufficiently to cause the side wall of the charge shell 66 to cut off the inlet port 72 of its housing and to then cause the discharge ports 71 and 73 to register so as to open the outlet port.

It is thus seen that the walking beam is connected through the connecting rods 53, 54 and their connections, with oppositely-arranged oscillating segments 47, 48; and the rack 75 is operated by connection through the operating rods 74, 78, with the oscillating segments 41, 42, and therefore, at each revolution of the wheel 38, the rack is operated to and fro at widely separated periods; and the walking beam is oscillated in one or the other direction through widely separate periods in alternation with the operation of the rack, and that the rack is always inactive while the walking beam is being operated, and the walking beam is always inactive while the rack is being operated.

The movement of the rack 75 in one direction is adapted to oscillate the rotary shells sufficiently, relative to the housings, to first close the outlet and then open the inlet of one shell at one period and likewise to first close the outlet and open the inlet of the other shell at another period, and that the rod 53 will operate the walking beam to cause suction in the shell having its inlet open and its outlet closed, and to cause pressure in the shell having its inlet closed and outlet open; and vice versa; so that each revolution of the shaft is invariably accompanied by a succession of operations causing simultaneous suction into one shell and expulsion from the other shell at one time, and vice versa, at another time.

A supply pipe 179 leading from a source of supply, not shown, is connected by supply branches 180, 181, with the housings 69, 68, respectively, so that whenever suction is applied to either of the shells, liquid may be supplied to such shell from the supply pipe 79; and when pressure is applied in such shell its communication with the source of supply is cut off and said pressure is effective to discharge the liquid forcibly through the outlet.

The construction shown is such that when the mutilated gear 2 operates the pinion 3 to move the belt 22, and advance a set of empty receptacles into filling position, the arms 56, 57 of the walking beam and also the rack 75 are idle; and the construction and arrangement and operation of the various points is also such that when the arms 56, 57 are actuated, the belt 22 and rack 75 are idle; and when the rack 75 is actuated the belt 22 and arms 56, 57 are idle so that the various parts are operated intermittently without interference. After the belt 22 has been stepped forward to bring an empty set of receptacles into filling position beneath the outlets of the housings, the belt remains stationary and the walking beam remains inactive while the rack 75 is shifting to the right in Fig. 4, thus oscillating the shells so as to close the inlet and open the outlet of the filled shell and to open the inlet and close the outlet of the empty shell 67. While this is being accomplished the walking beam and belt are inactive; then the walking beam 55 is operated to the left by the revolving segment 40 oscillating the oscillating segment 48 with obvious results, and so on.

By these means each revolution of shaft 1 causes the successive charging of two receptacles and the shifting of the charged receptacles from, and two empty receptacles to, filling position.

Attendants will place the trays of empty receptacles on the belt and remove the trays of charged receptacles from the belt as the work proceeds and since the peripheries of the end receptacles of each row in a filled tray are tangent to the ends of the tray, respectively the rows of empty receptacles pass in continuous and unbroken succession under the outlets of the chargers.

The bottoms of the housings and shells are thin so that adhesion of the viscid liquid thereto is slight; and since the outlet ports are small, the liquid is ejected therethrough with considerable force. In consequence of the construction and operation stated, there is no dripping of liquid to smear the rims or the outsides of the receptacles.

The chambers of the shells are made of ample size and the amount of liquid discharged at each stroke is determined by the length of stroke of the plungers. Such length of stroke is regulated through the length adjustment of the rocker arms 79, 80, 81 and 82. In the form shown each arm comprises threaded telescoping members 83, 84. The member 83 is fixed to its rock shaft by a set screw 85 and the member 84 is pivoted to its connecting rod, as the rod 74, for instance, by a pin 86.

The connecting rods are sectional, each comprising end sections 87, 88 connected by a turn-buckle 89 with a locking set screw 90.

When the parts are assembled they are not easily put out of adjustment and the purpose of this is to avoid variations of charge so that the receptacles will be uniformly charged unless the apparatus is intentionally readjusted.

Suitable means are provided to prevent the oscillations of the shells from changing the adjustment of the plungers. To this end jam nuts 91 are provided on the rod sections 92 to jam against the socket sections 93 of the connecting rods 60, 61.

I claim:

1. The combination with two measuring devices, of a single conveyor adapted to intermittently move receptacles two by two simultaneously, beneath said devices alternately operable means to charge the receptacles, while stationary between steps; and means connected with the charge-operating means to move the conveyor step by step during periods when the charges are not being received or delivered.

2. The combination with two housings each provided with an inlet and an outlet, of a conveyor adapted to remove and emplace receptacles beneath said housings; shells oscillatable within the housings respectively and provided with inlets and outlets to register with the housing inlets and outlets, said shells being adapted to open and close the inlets and outlets for receiving and delivering measured charges of viscid material; means to produce suction and pressure within said shells in alternation; means to operate the suction and pressure-producing means during rotation of the shells, for suction and pressure, to alternately open the inlet port of each shell during suction therefor and to close the inlet and open the outlet during the pressure action; and step by step means to operate the conveyor while the suction and pressure devices are not in action.

3. The combination with two housings and two shells each provided with an inlet and an outlet port, the shells being nested in the housings; of means to alternately cause suction in one shell and pressure in the other shell; means to operate the shells to open the inlet and close the outlet for suction and to close the inlet and open the outlet for discharge; a shaft; toothed segments adapted to be revolved by the shaft; oppositely-arranged oscillating segments adapted to be operated by one of the revolvable segments; means connecting one of said oscillating segments with the means for operating the shells with relation to their housings to open and close and close and open the inlet and outlet ports in course; oppositely arranged oscillating segments adapted to be operated by the second revolving segment; and means operatively connecting said oscillating segments to the means for producing suction and pressure in the shells respectively.

4. The combination with two housings and two shells each provided with an inlet and an outlet port, the shells being nested in the housings; of means to alternately cause suction in one shell and pressure in the other shell; means to operate the shells to open the inlet and close the outlet for suction and to close the inlet and open the outlet for discharge; a shaft; toothed segments adapted to be revolved by the shaft; oppositely arranged oscillating segments adapted to be operated by one of the revolvable segments; a rack and gear operated by one of said segments for operating the shells with relation to their housings to open and close and close and open the inlet and outlet ports in alternation; oppositely arranged oscillating segments adapted to be operated by the second revolving segment; and means operatively connecting said oscillating segment to the means for producing suction and pressure in the shells respectively.

5. The combination with nested housings and shells arranged as a couple provided with inlets and outlets; of means to alternately cause suction and pressure in the shells successively; means to operate the shells to open the inlet and close the outlet for the suction stroke and to close the inlet and open the outlet for the discharge stroke; a shaft; toothed segments adapted to be revolved by the shaft; oppositely arranged oscillating segments adapted to be operated by one of said revolving segments; means connecting said oscillating segments to operate the means for producing suction and pressure in the shells respectively; and step by step mechanism adapted and arranged to move empty receptacles to, and charged receptacles from, beneath the housings.

6. The combination with two housings having cylindrical chambers each provided with an inlet in one side and an outlet in the bottom; of shells oscillatable within the housings respectively and provided with inlets and outlets, and adapted to cooperate with the housings and their inlets and outlets; oscillating means connecting said shells; said housings being adapted during simultaneous oscillations of the shells to open the inlet and close the outlet of one of said shells and to open the outlet and close the inlet of the other of said shells; means to produce suction within one shell when its outlet is closed and inlet open; and means operating simultaneously therewith to cause pressure within the other shell while the inlet of such other shell is closed and the outlet open.

7. The combination with two housings having cylindrical chambers each provided with an inlet and an outlet; of shells intermittently oscillatable within the housings respectively and provided with inlets and outlets, and adapted to cooperate with the housings and their inlets and outlets; oscillating means connecting said shells; said housings being adapted during simultaneous oscillations of the shells to open the inlet and close the outlet of one of said shells and to open the outlet and close the inlet of the other of said shells; means to produce suction within one shell when its outlet is closed and inlet open; means operating simultaneously therewith to cause pressure within the other shell while the inlet of such other shell is closed and the outlet open; and conveyor means timed with the shells and suction and pressure producing means to remove and emplace receptacles beneath the housings when the shells and suction and pressure means are at a position of rest.

8. The combination with supply means, of two housings each provided with an inlet and an outlet; rotary shells inside the housings each provided with an inlet and an outlet adapted to register with the inlet and outlet of its respective housing; means to conduct a supply from the supply means to the inlets; and means to oscillate said shells to alternately open the inlet and close the outlet of one housing and to close the inlet and open the outlet of the other housing.

9. The combination with a support, of a pinion provided with a crank pin and journaled on the support; a master shaft; a mutilated gear connected to the master shaft and adapted to cause one revolution of the pinion at one portion of each revolution of the shaft; a rock shaft having a rocking arm; means connected to the mutilated gear to rock the rock shaft while the pinion is at rest; a ratchet wheel; a pawl to engage the teeth of the ratchet wheel; a pin and slot and lever connection operably connected to the crank pin and connected to operate the pawl; a drum driven by the ratchet wheel; a second drum; a belt bent around said drums and having a horizontal upper limb; a guide for the upper limb of the belt; trays provided with seats for receptacles and adapted to be carried by the belt; said seats being equal in width to the diameters of the receptacles to be filled and equal in length to a multiple of such diameters so that when a seat is filled it will contain a row of receptacles extending from end to end of the tray, the periphery of the receptacles being tangent to the ends of the tray; and means connected with the rocking arm to deliver charges to the receptacles between the periods of operation of the pinion by the mutilated gear.

10. An apparatus to charge receptacles, comprising a pipe provided with two branches; housings connected to said branches and each provided with a port to receive charges from said branches; shells provided with gears respectively; said shells being mounted in the housings and provided with inlets; rack means to operate the gears simultaneously to oscillate the shells; the inlets to the shells being so arranged that one shell closes the inlet and opens the outlet thereto and opens the inlet and closes the outlet to the other shell at one oscillation and closes the outlet to the one shell and opens the inlet to the other shell at a succeeding oscillation; said shells and housings being provided with discharge outlets adapted to open and close respectively; the oscillation of each shell operating to cause the discharge outlet of such shell to be closed while the inlet to said shell is open; a master shaft; means connected to the master shaft to operate the rack means; and means connected to the master shaft to cause suction in each shell when its inlet is open and pressure in each shell when its inlet is closed.

11. The combination with a bell crank having two arms; of means to oscillate said bell crank; plungers operated by said arms; shells in which the plungers operate; said shells being provided with inlet and discharge ports; and means to oscillate said shells to cause said shells to open and close the inlets and close and open the outlets for suction and pressure strokes of the plungers respectively.

12. The combination with a bell crank having two arms; of means to oscillate said bell crank; plungers operated by said arms; shells in which the plungers operate; said shells being provided with inlet and discharge ports; and means to oscillate said shells to cause said shells to open and close the inlets and close and open the outlets for suction and pressure strokes of the plungers respectively; and step by step means to remove and emplace receptacles beneath the discharge ports when the discharge ports are closed.

13. In a receptacle filling apparatus a table having a level surface; a belt on said surface; trays adapted to be carried by said belt and adapted to carry an unbroken line of receptacles of common diameter; means to alternately charge said receptacles; means to alternately discharge said receptacles, and means to move the belt by steps equal to said common receptacle diameter while the charging means are at rest.

14. In a receptacle charging apparatus of the character described, means for delivering charges to receptacles; a belt having a limb beneath the charge delivering means; trays adapted to be carried by such limb and having a length equal to a multiple of receptacle diameters; retainers to hold the end receptacles with their peripheries tangent to the ends of the trays; and means connecting the charge delivering means to the belt to move the belt step by step between the successive receptacle charging operations.

15. The combination with means for intermittently supplying charges to receptacles, of a drum; a ratchet wheel connected to the drum; a second drum; a belt trained around the drums; a horizontal guide for the upper limb of the belt; the ratchet teeth being proportional to the common diameter of the receptacles, and means connected with the charging apparatus to move the drum the space of one ratchet tooth between each two successive operations of the charging means.

16. The combination with two fixed hollow members each having an inlet and outlet, of two rotary hollow members mounted in said fixed hollow members and each provided with an inlet and an outlet; pinions on the rotary members; a rack to operate the pinions; the outlets and inlets of the members being so arranged that at one position of the rack the inlet to one of the rotary members will be open and its outlet closed, and the inlet of the other of said members will be closed and the outlet open; and means in said rotary members to cause suction in the one, while its inlet is open and outlet closed, and pressure in the other while its inlet is closed and outlet open.

17. A measuring apparatus comprising a set of relatively rotatable hollow members provided with inlet ports that are open at one position and closed at another position of relative rotation and also provided with outlet ports that are closed when the inlet ports are open, and open when the inlet ports are closed; a second set of hollow members similar in construction to the first set of members and provided with inlet ports and outlet ports corresponding to those of the first set that are opened and closed reversely to the ports of the first set; plungers operating respectively in the inner members of each set; means connecting the plungers for alternate operation, each plunger being operable to produce suction when the inlet ports of its set are open and its outlet ports are closed and to produce pressure in its chamber when the inlet ports thereof are closed and outlet ports thereof are open, and means to rotate one member of each set relative to the other member of its set in time with the plunger operating means to open and close the ports as required.

18. A measuring device comprising two relatively rotatable members one seated within the other, said members being provided with inlet ports adapted to be open in one position of relative rotation and closed in another position, said members also being provided with outlet ports adapted to be closed when the first ports are open and to be open when the first ports are closed; a plunger operable in each inner member to cause suction through the inlet ports when the same are open and to cause discharge through the outlet ports when the same are closed; a bell crank to operate the plunger; rack and gear to cause relative rotation of the members; and a shaft operably connected to the bell crank and to the rack.

19. A measuring device comprising two relatively rotatable members one seated within the other, said members being provided with inlet ports adapted to be open in one position of relative rotation and closed in another position, said members also being provided with outlet ports adapted to be closed when the first ports are open and to be open when the first ports are closed; a plunger operable in each inner member to cause suction through the inlet ports when the same are open and to cause discharge through the outlet ports when the same are closed; a bell crank to operate the plunger; rack and gear to cause the relative rotation of the members; a shaft operably connected to the bell crank and to the rack; and step by step means connected to the shaft and arranged to remove and emplace receptacles beneath said members between successive couples of discharge operations.

20. In a measuring device comprising a plurality of chambers, each chamber being provided with an inlet port at one side and an outlet port in its bottom, means to cause the inlet port to be open and the outlet port to be closed of one chamber at one period and the inlet port to be closed and the outlet port to be open of another chamber at the same period; and means connected to said opening and closing means to cause suction in one of the chambers when the inlet port is open and the outlet port closed and to cause pressure in another of the chambers when the outlet port is open and the inlet port closed.

21. Measuring apparatus comprising a plurality of shells, each shell being provided with an inlet port and with an outlet port; means to oscillate said shells to cause the outlet port to be closed when the inlet port of one shell is open, and to cause the outlet port to be open when the inlet port of another shell is closed; plungers, one for each shell; means to alternately operate the plungers in said shells to cause suction in the shell whose inlet port is open and outlet port closed, and to produce pressure in the shell whose outlet port is open and inlet port is closed; and means controlling the plunger operating means to adjust the stroke of the plungers.

22. Measuring apparatus comprising a chamber provided with an inlet port and with an outlet port; means to cause the outlet port to be closed when the inlet port is open, and to be open when the inlet port is closed; a plunger operating in the chamber; means to operate the plunger in said chamber to cause suction in the chamber when the inlet port is open and the outlet port closed and to produce pressure in the chamber when the outlet port is open and the inlet port is closed; a bell crank to operate the plunger; a rock shaft having an arm that is adjustable as to length; a connecting rod connecting said arm to the bell crank; and a shaft operably connected to the rock shaft and the port closing and opening means.

23. A measuring device comprising two chambers each provided on its side with an inlet and on its bottom with an outlet; a main shaft; means connected to said shaft to open the inlet and close the outlet of one of said chambers and to close the inlet and open the outlet of the other of said chambers at one period and to open the inlet and close the outlet at another period; plungers operable in the chambers respectively, and means to invariably cause suction in each chamber when the inlet of such chamber is open and the outlet closed and to invariably cause pressure in each chamber when the inlet is closed and the outlet open.

24. A measuring device comprising two chambers each provided on its side with an inlet and on its bottom with an outlet; a main shaft; means connected to said shaft to open the inlet and close the outlet of one of said chambers and to close the inlet and open the outlet of the other of said chambers at one period and to open the inlet and close the outlet at another period; plungers operable in the chambers respectively, means connected to said shaft to operate said plungers to invariably cause suction in each chamber when the inlet of such chamber is open and the outlet closed and to cause pressure in each chamber when the inlet is closed and the outlet open; and means timed with the plungers and with the inlet and outlet opening and closing means and actuated by said shaft to remove and emplace receptacles with relation to the outlets when said outlets are both closed.

25. A measuring device comprising two stationary hollow members each provided with an inlet and an outlet; rotary members in said stationary members each provided with an inlet and an outlet and each adapted to close its inlet and open its outlet at one position and to open the inlet and to close the outlet at another position; means connecting the rotary members to cause one to open its inlet and close its outlet at a period when the other rotary member has closed its inlet and opened its outlet; and plungers operable in the rotary members respectively, each adapted to cause suction in its rotary member when the inlet is open and the outlet closed and to cause pressure in such rotary member when its inlet is closed and outlet open.

26. A measuring device comprising two stationary hollow members each provided with an inlet and an outlet; rotary members in said stationary members each provided with an inlet and an outlet and each adapted to close its inlet and open its outlet at one position and open its inlet and close its outlet at another position; means connecting the rotary members to cause one to open its inlet and close its outlet at a period when the other rotary member has closed its inlet and opened its outlet; and plungers operable in the rotary members respectively, each adapted to cause suction in its rotary member when its inlet is open and its outlet closed and to cause pressure in such rotary member when its inlet is closed and outlet open; a master shaft; four rock shafts arranged in couples and operated by the master shaft each of said rock shafts being provided with a rocking arm; connecting rods connecting the arms of one couple with the means for opening and closing the ports of the rotary members; and connecting rods connecting the arms of the second couple with the means for causing suction and pressure in said rotary members.

27. The combination with a supply pipe, of two branches to discharge material therefrom; stationary hollow members for said branches, each hollow member having on its side an inlet to receive liquid from its branch and having on its bottom an outlet to discharge such liquid; a main shaft; means connected to said shaft to open the inlet and close the outlet of one hollow member and to close the inlet and open the outlet of the other hollow member at one period of operation; and means to cause suction in the one member when its inlet is open and outlet closed, and pressure in the other hollow member while its inlet is closed and outlet open.

28. A measuring apparatus constructed to operate in a cycle and comprising two measuring devices each provided with an outlet in its bottom; intermittent means to intermittently discharge through said outlets during a predetermined portion of the cycle; and step by step means to remove filled receptacles from beneath and to replace them with empty receptacles during periods between each two successive discharges.

29. A measuring apparatus constructed to operate in a cycle and comprising two measuring devices each provided with an outlet in its bottom; intermittent suction means to fill, and pressure means to intermittently discharge during a predetermined portion of the cycle; step by step means to remove filled receptacles from beneath and to replace them with empty receptacles during periods between the intermittent discharges; a master shaft; a gear wheel fixed to the shaft and provided with two toothed segments that are oppositely arranged on the gear wheel and lie in different planes of revolution; two couples of rock shafts arranged quartering about the master shaft, the shafts of each couple being opposite to each other with relation to the master shaft; arms on the rock shafts respectively; oscillating toothed segments on the arms to engage the toothed segments of the gear wheel; connecting rods operably connecting one couple of the rock shafts with the suction and pressure means; and connecting rods operably connecting the other couple of rock shafts with the outlet and inlet opening and closing means.

30. The combination with a support, of a horizontal carrier adapted to move trays along said support, trays having receptacle recesses terminating at the outer ends of said trays and adapted to said support and adapted to contain an exact number of receptacles in line from end to end of the tray and contacting with one another, so that a train of trays may present an unbroken line of receptacles; intermittent means to charge liquid into said receptacle; and step by step mechanism to move the carrier intermittently between the periods of operation of the charging means.

31. In a measuring apparatus the combination with a housing having a circular wall and a bottom, and having a lateral inlet through the wall and a vertical outlet through the bottom, of a shell inside the housing, said shell being provided with side walls and a bottom and with a lateral inlet through the side walls adapted to register with the lateral inlet of the housing and also provided in its bottom with an outlet adapted to register with the outlet in the bottom of the housing; a piston operable in the shell; means to rotate the shell to alternately bring the inlet of the shell into and the outlet of the shell out of register with the inlet and outlet of the housing respectively and to bring the outlet of the shell into, and the inlet of the shell out of registry with the outlet and inlet of the housing respectively; means to move the piston up when the inlet is open and the outlet closed, and down when the outlet is open and the inlet closed; a second measuring device similar in construction to the first measuring device, and having the inlet and outlet thereof arranged for alternating action relative to the shell of the first device, and means connecting said shells and pistons for operating said shells in alternating action, and said pistons simultaneously in reverse directions.

32. In a measuring apparatus the combination with a housing having a circular wall and a bottom, and having a lateral inlet through the wall and a vertical outlet through the bottom, of a shell inside the housing, said shell being provided with side walls and a bottom and with a lateral inlet through the side walls adapted to register with the lateral inlet of the housing and also provided in its bottom with an outlet adapted to register with the outlet in the bottom of the housing; a piston operable in the shell; means to rotate the shell to alternately bring the inlet of the shell into and the outlet of the shell out of register with the inlet and outlet of the housing respectively and to bring the outlet of the shell into, and the inlet of the shell out of registry with the outlet and inlet of the housing respectively, means to move the piston up when the inlet is open and the outlet closed, and down when the outlet is open and the inlet closed; a second measuring device similar in construction to the first measuring device, and having the inlet and outlet thereof arranged for alternating action relative to the shell of the first device; a main shaft and means actuated by said shaft and including a walking beam operably connected to said pistons for operating the piston simultaneously in reverse directions.

In testimony whereof, I have hereunto set my hand at Los Angeles, California, this 21st day of June 1918.

SYLVANUS H. KELLOGG.

Witness:
JAMES R. TOWNSEND.